Aug. 2, 1966     E. BLAICH ETAL     3,264,141
STORAGE BATTERIES
Filed Nov. 18, 1963
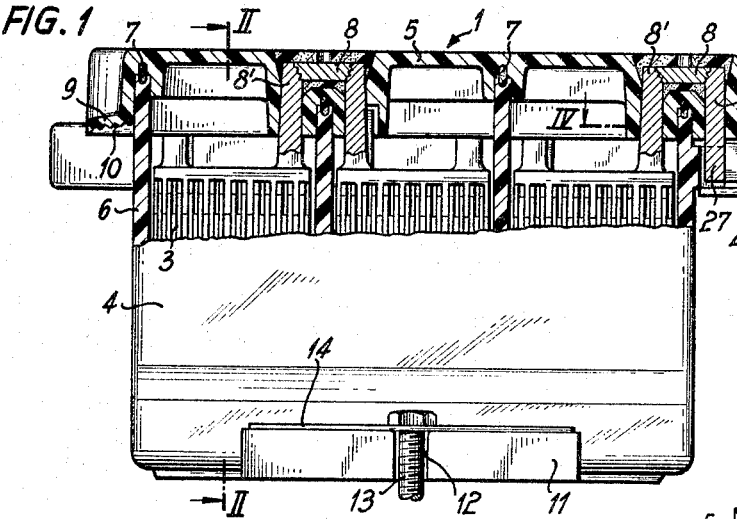
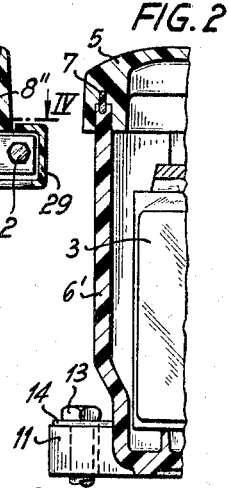
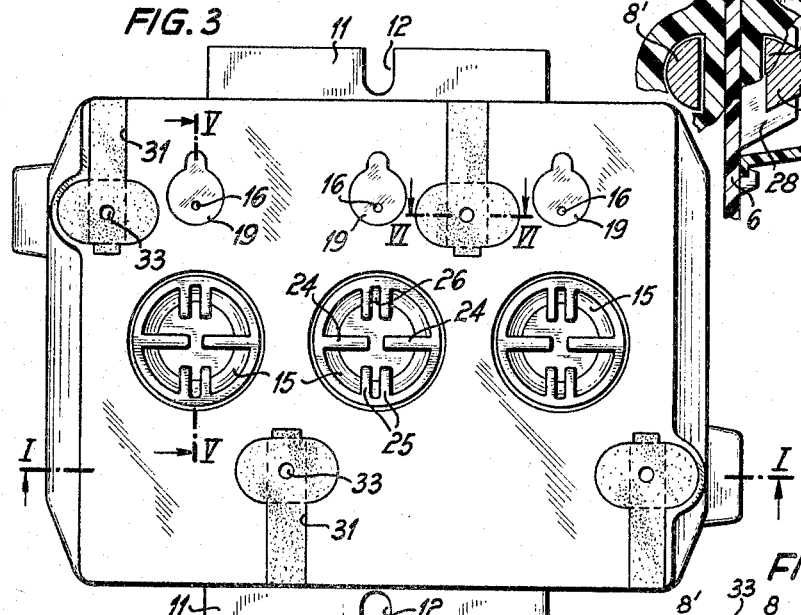
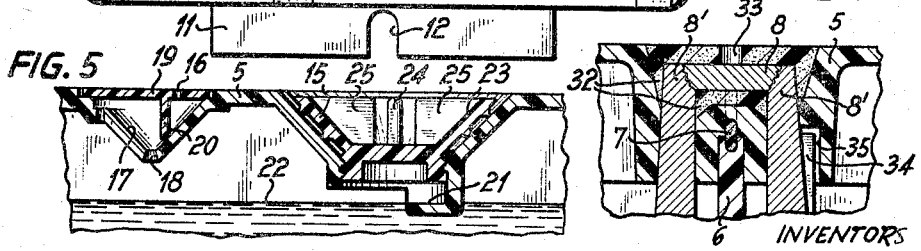
INVENTORS
Emil Blaich
Gert Niemann
by Michael S. Striker
Atty

3,264,141
STORAGE BATTERIES

Emil Blaich and Gert Niemann, Hildesheim, Germany, assignors to Robert Bosch G.m.b.H., Stuttgart, Germany
Filed Nov. 18, 1963, Ser. No. 324,383
Claims priority, application Germany, Nov. 21, 1962, B 69,708
12 Claims. (Cl. 136—134)

The present invention relates to storage batteries, particularly of the type used in automobiles and the like.

Conventional storage batteries of this type are too large and are relatively complex to assemble. Attempts have been made to avoid these drawbacks, but up to the present these attempts have proved to be unsatisfactory. For example, it has been proposed to provide batteries where the connections between the poles are beneath the top surface of the battery, but this has only meant that the height of the battery had to be extended so that there was no real reduction in the size of the battery. Also, where batteries of relatively low height have been provided, it has become necessary to increase the horizontal cross sectional area of the battery so as to maintain in the cells a number of plates of sufficiently large area to give the required output, so that here again there was no real reduction in the overall volume of the battery. Also, it has been proposed to direct the pole pieces horizontally through the side walls of the battery so that they could be connected to each other at the exterior of the battery but at the side thereof, and this expedient has proved to be impractical because of the difficulties encountered in maintaining the side walls of the battery housing fluid-tight at the places where the pole pieces pass through these side walls.

It is accordingly a primary object of the present invention to provide a battery of relatively small height and outer dimensions when compared to other batteries of the same output while at the same time making the battery very easy and inexpensive to manufacture.

Thus, it is an object of the present invention to provide a simple battery structure which is of low height and which at the same time is capable of being easily assembled in such a way that the several cells of the battery are all fluid-tightly closed at the connections between the housing and cover of the battery.

Also, it is an object of the present invention to provide a battery of the above type which can be very easily and conveniently carried so that the mounting of the battery at a desired location can be very easily carried out.

Furthermore it is an object of the present invention to provide a battery which when it is placed in a desired position where it is to be used can be very securely mounted in this position without requiring the battery to have elements which extend to an undesirable extent beyond the battery housing.

It is also an object of the present invention to provide a battery of the above type which can be easily filled to an extent higher than in conventional batteries while at the same time reliably preventing any splashing or spraying of liquid from the interior of the battery cells to the exterior of the battery.

Furthermore, it is an object of the invention to provide a structure where the elevation of the surface of the liquid in the battery cells can be very easily and quickly regulated so that this elevation will be maintained precisely at a predetermined level.

Furthermore, it is an object of the present invention to provide a battery where the cables which extend to the battery can be conveniently connected to the battery and where at the same time the places where the cables are connected to the battery are securely protected while remaining freely accessible whenever desired.

With these objects in view the invention includes, in a storage battery, a housing which has a bottom wall and two pairs of opposed side walls extending upwardly from the bottom wall and a partition extending between one of the pairs of opposed side walls of the battery housing parallel to this latter pair of side walls and upwardly from the bottom wall of the housing so as to divide the interior of the housing into at least two cells. The partition and pair of opposed side walls parallel thereto are respectively formed at their upper edge portions with notches. At least two groups of plates are respectively located in the cells, and there are three pairs of pole pieces between which the partition and the pair of opposed housing side walls parallel thereto are respectively located with the notches of these three walls situated respectively between the pairs of pole pieces. These pole pieces include two outer pole pieces which are respectively carried by the pair of opposed side walls of the battery housing at the exterior thereof and two inner pole pieces which are respectively located adjacent to the latter pair of opposed housing side walls in the interior of the housing and operatively connected to the groups of plates which are respectively located in the cells. The pole pieces also include two additional pole pieces which are respectively located on opposite sides of and adjacent to the partition and which are also operatively connected to the groups of plates in the cells, respectively. A cover is located on and covers the housing, and this cover has an underside which is formed with a continuous groove which receives upper edge portions of the side walls of the housing, the cover being formed at its underside with an additional uninterrupted groove which communicates with its continuous groove and which receives the upper edge portion of the partition. The upper edge portions of all of the housing side walls and the partition are fluid-tightly connected along their entire length to the cover in the grooves thereof, and the cover has grooved portions which extend downwardly into the above-mentioned notches respectively between the pairs of pole pieces so that the connection of the cover to the housing extends uninterruptedly between the pole pieces. This cover is formed in its upper face with at least three recesses which extend downwardly below the upper face of the cover, and the cover is also formed with three pairs of openings which respectively extend from these recesses through the cover and the several pole pieces respectively extend upwardly through and fill these openings, the several pole pieces terminating in free end portions which are situated within these recesses of the cover beneath the upper face thereof. Finally, there are three bridging members which are respectively located in the recesses of the cover beneath the upper face of the cover and which respectively bridge the three pairs of pole pieces so as to electrically interconnect the pairs of pole pieces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional side elevation of a battery according to the present invention, the upper sectional part of FIG. 1 being taken along line I—I of FIG. 3 in the direction of the arrows;

FIG. 2 is a fragmentary transverse sectional view of the battery taken along line II—II of FIG. 1 in the direction of the arrows;

FIG. 3 is a top plan view of the battery of FIGS. 1 and 2;

FIG. 4 is a sectional view, on an enlarged scale as compared to FIGS. 1-3, of the structure of the pole pieces and the manner in which they cooperate with adjoining structure, FIG. 4 being a plan view taken along line IV—IV of FIG. 1 in the direction of the arrows;

FIG. 5 is a fragmentary transverse sectional view of the filling opening assembly and gas-escape assembly of the cover, FIG. 5 being taken along line V—V of FIG. 3 in the direction of the arrows; and FIG. 6 is also an enlarged sectional fragmentary view, FIG. 6 being taken along line VI—VI of FIG. 3 in the direction of the arrows and showing the manner in which the pairs of cooperating pole pieces are connected to each other in the cover of the battery.

Referring now to the drawings, the electric storage battery 1 illustrated therein includes a pair of laterally extending connector portions 2 to which the cables are adapted to be connected, and it will be noted that these connector portions 2 are situated beneath the top of the battery and extend horizontally from a pair of opposed side walls of the battery, one of the connector portions 2 being clearly visible at the right of FIG. 1 and being shown on an enlarged scale in FIG. 4. The battery 1 is composed of a completely closed housing made of a suitable plastic material such as polystyrene, and in the illustrated example the housing has three cells which respectively contain the groups of plates 3. The housing of the battery of the invention includes the lower housing proper 4 which forms the container for all of the various components of the battery and the cover 5 which is located on and fluid-tightly closes the housing 4, this cover 5 being formed over the several cells with filling openings capable of being closed by the plugs 15.

Each group of plates 3 is operatively connected with a pair of pole pieces 8', and as is shown in FIG. 1 as well as in FIG. 6 the pole pieces 8' extend upwardly through openings of the cover 5 into recesses which extend beneath the upper face of the cover 5 with the several pole pieces 8' terminating in free ends which are respectively located in these recesses beneath the upper face of the cover 5, and it will also be noted that the pole pieces 8' completely fill and close the openings of the cover 5 through which these pole pieces 8' extend. Within the recesses of the cover which receive the pole pieces 8' are located bridging members 8 which extend across and are electrically connected with the pairs of pole pieces so that in this way the pole pieces are electrically interconnected, and it will be noted that these bridging members 8 are also located beneath the upper face of the cover 5. Furthermore, it is to be noted that the left and right pair of side walls 6 of the housing 4 carry at their exteriors outer pole pieces 8'', and these outer pole pieces, which are integral with the connector extensions 2 referred to above, extend upwardly through openings of the cover 5 into recesses thereof in precisely the same way as all of the inner pole pieces 8', and in addition these outer pole pieces 8'' are connected to their cooperating inner pole pieces 8' in precisely the same way as the remaining pole pieces, so that the manufacturing and assembly of the parts is greatly simplified since all of the pole pieces have the same construction and are electrically interconnected in precisely the same way once the cover has been placed on the housing 4.

It is to be noted that the cover 5 is formed at its underside with a continuous groove which receives the upper edge portions of all of the side walls 6 of the housing 4, and in addition the cover 5 is formed at its underside with transverse grooves communicating with the continuous peripheral groove thereof and receiving the upper edge portions of the transverse partitions in the interior of the housing 4 which divide the interior thereof into the several cells shown most clearly in FIG. 1. As is indicated in FIGS. 1 and 2, the upper end faces of the side walls and partitions of the housing 4 are formed with grooves which extend continuously along the entire lengths of these upper end faces, and the base of the grooves of the cover 5 is also formed with continuous uninterrupted grooves, and a sealing mass 7 is located in these cooperating grooves in the manner shown in FIGS. 1 and 2 so that in this way the cover 5 is fluid-tightly connected with the housing 4. The cover 5 may be made of the same thermoplastic material as the housing 4 and the sealing mass 7 itself may be made of the very same thermoplastic material which is injected in a molten stage through suitable openings into the grooves so as to harden therein and form a reliable bond with the cover 5 and the housing 4. Furthermore, it will be seen that in accordance with the present invention the pair of opposed side walls 6 which are shown at the left and right of FIG. 1 as well as the partitions in the interior of the housing 4 are respectively formed with notches in their upper edges, and these notches are respectively situated between the pairs of pole pieces between which the left and right walls 6 of FIG. 1 and the partitions respectively extend. Furthermore, the grooved portions of the cover 5 extend downwardly into these notches so as to provide at these notches connections between the housing and cover which are in no way interrupted and which extend continuously from all of the other connecting portions between the housing and the cover. Thus, in the region of the pole pieces the elevation of the connection between the housing and the cover is lower than the top ends of the pole pieces, as is particularly apparent from the right wall 6 of FIG. 1 and the left partition shown in FIG. 1, while at the remaining portions of the housing and cover the elevation of the connection therebetween is completely independent of the pole pieces. In this way the connection between the housing and the cover extends uninterruptedly between the pairs of pole pieces and it is unnecessary to take any special measures to provide a fluid-tight connection between the housing and cover at the places where the pole pieces are located.

The construction of the battery cover provides a great saving in space while maintaining plates in the cells of the required number and size, and in addition the height of the battery need not be extended above the upper surface of the cover 5 in order to accommodate various additional components of the battery. Thus, it will be seen that at the left and right side walls 6 of the housing 4 the grooved portions of the cover 5 are extended downwardly at the exterior of the battery housing so that the cover 5 has at the left and right walls 6 of FIG. 1 relatively low extensions which are formed integrally with outwardly extending portions 9 which extend longitudinally along the walls 6 at the right and left of FIG. 1 and which are provided at their underside with grooved surfaces 10, so that these extensions 9 form convenient portions to be engaged for the purpose of carrying the battery, without in any way increasing the height of the battery. Moreover, as is apparent from FIG. 2, the longitudinal side edge portions of the cover 5 are rounded so that a holding strap can be placed directly across the upper face of the cover if such a holding strap is required to hold the battery at a desired location. However, the battery is also capable of being fixed at a desired location without the use of such holding straps, and for this purpose the battery housing 4 is provided at its lower portion and along its opposed longitudinal sides with integral holding strips 11. The pair of opposed side walls 6' which extend along the longitudinal sides of the battery are directed inwardly at their lower portions where they are joined to the bottom wall of the battery housing, as is particularly apparent from FIG. 2, and it is at these inwardly directed portions of the side walls 6' that the elongated holding strips 11 are formed integrally with the battery housing extending along the bottom thereof and along the lower inwardly directed portions of the side walls 6', so that through the use of these strips 11 it is possible also to very securely mount the battery at a desired location. For this purpose the strips 11 are respectively formed with notches 12 (FIG. 3) through which holding bolts 13 are adapted to pass, and the holding pressure provided by the bolts 13 can be distributed over the entire upper surface of the holding strips 11 by way of metal plates 14 which rest on the upper surface of the strips 11 and which are formed with openings through which the bolts 13 respectively pass, as shown in FIGS. 1 and 2. The result of directing the lower portions of the opposed side walls 6' inwardly as shown in FIG. 2 is not only a reduction in the outer dimensions of the entire battery but also a better support for the plates in the cells, since, as is apparent from FIG. 2, these inwardly directed portions of the side walls 6' are located directly adjacent to the lower portions of the plates in the several cells and thus a very secure support for the plates is also provided by the inwardly directed portions of the side walls 6'.

As is apparent particularly from FIG. 5, the filling openings which are closed by the plugs 5 are separate from the openings 16 through which gas can escape to the exterior of the battery. These gas-escape openings 16 are also situated so that they do not extend above the upper face of the cover and in addition they cooperate with the structure for preventing any acid from splashing or spraying to the exterior of the battery. Each opening 16 communicates with a funnel-shaped recess 17 formed in the cover 5 and extending downwardly from the top face thereof, and in addition at the bottom of the funnel-shaped recesses 17 the cover is formed with openings 18 through which the interior of the cells respectively communicate with the interior of the recesses 17. These recesses 17 are closed by plates 19 carried by the cover 5 substantially flush with the upper face thereof and fixed thereto in any suitable way such as by a suitable adhesive, for example, and it is these plates 19 which are formed with the opening 16 through which gas can escape after having passed through the openings 18 into the recesses 17. It will be noted that the several gas discharge openings 16 are respectively out of line with the openings 18 so that gas which passes through these latter openings cannot move directly up through the openings 16 to the exterior of the battery. The plates 19 are each formed with downwardly directed walls 20 extending into the recesses 17, and it will be noted that the openings 16 and 18 are located on opposite sides of the plane in which the wall 20 is located while the bottom edge of the wall 20 has a clearance with respect to the surface of the recess 17 which enables gas which passes up through the opening 18 to pass beneath the wall 20 and out through the opening 16. This wall 20 will reliably prevent any liquid in the cells which happens to splash or spray through the openings 18 from reaching the exterior of the battery.

The battery cover is provided at its filling openings which are closed by the removable plugs 15 with integral ledges 21 (FIG. 5) which extend beneath portions of the filling openings, and these ledges 21 are precisely located at the elevation at which the surface 22 of the liquid should be located, and it will be noted that this elevation is relatively high. As a result of the ledges 21 it is possible to remove from the interior of the cells, after having filled the latter to a height above the ledges 21 excess liquid with suitable suction syringes or the like, so that by rotating the bottom end of such a suction device on the ledge 21 it is possible to very precisely determine the elevation of the surface 22 of the liquid. Thus, excess liquid can be removed to provide a precisely determined elevation of the liquid in the cells, and as is apparent from FIG. 5 the surface of the liquid extends very close to the cover 5 so that the height of the entire battery is reduced to a minimum. For this reason the above-described separate openings 16 are provided for the escape of gas, since as a result of the small size of these openings and the structure associated therewith any escape of droplets of acid or spray to the exterior through the gas-escape openings is reliably prevented, particularly with the structure of the invention where the surface of the liquid is so close to the cover 5. Thus, while the liquid cannot escape through the relatively small gas-discharge openings 16, it is in addition possible to provide closing plugs 15 for the filling openings of a construction which does not include any gas-discharge opennigs so that these plugs 15 are completely closed and can be made also of a very small height so that they can extend into the cover recesses which form the filling openings without extending above the upper face of the cover. The upper portions 23 of the plugs 15 have exterior surfaces which fluid-tightly close the battery at the filling openings thereof, and in addition these upper portions 23 are hollow and receive the ribs 24 and 25 so that it is possible for the operator to engage these ribs and turn the plugs 15. If it is not possible for the operator to turn the plug 15 by hand, it will be noted that the pairs of opposed ribs 25 define aligned spaces 26 adapted to receive a suitable coin, so that by placing such a coin in the spaces 26 is is possible for the operator to turn the plug 15.

Each of the outer pole pieces 8" is made, for example, of hard lead and has a lower foot portion 27 of dovetail cross section, and the right and left side walls 6 of FIG. 1 are provided at their exterior with integral dovetail grooves which mate with and receive these foot portions of the outer pole pieces 8". The dovetail groove portions of the walls 6 can be tapered or provided at their bottom ends with inwardly directed shoulders to engage the underside of the outer pole pieces 8" to limit the downward movement of the latter or these pole pieces may be provided at the top ends of the dovetail grooves with outwardly directed shoulders engaging the top faces so that in this way the downward movement of the pole pieces 8" in the grooves will be limited. FIG. 4 in particular shows the dovetail groove portions 28 of the shorter side walls 6 of the housing and the manner in which the foot portion 27 is received therein.

The connector extensions 2 of the outer pole pieces 8" are covered by electrically non-conductive plastic cover members 29, and these cover members are elastic so that they are capable of yielding and snapping back to their original shape. As is also shown most clearly in FIG. 4 the covers or cover members 29 are formed at their outer periphery with outwardly directed flanges which are respectively snapped into claw portions formed integrally with the shorter side walls 6 at the exterior thereof, so that in this way it is simple to snap the cover members 29 into position over the connector extensions 2 so as to cover and protect the latter. The flanges of the cover members 29 are located at the side edges thereof and each wall 6 is provided with a pair of claw portions receiving these flanges of the cover members 29. The cover members 29 almost completely surround the connector extensions 2. It is only at their lower portions that the covers 29 are formed with slots which do not cover the extensions 2 and which serve as passages through which the connecting cables can extend. For the purpose of clearly illustrating the structure the cover of FIG. 4 as well as the cover member 29 illustrated therein is broken away to show the details of the elements illustrated in FIG. 4.

FIG. 6 shows the manner in which a bridging member 8 extends across and is connected to a pair of cooperating pole pieces 8'. The ends of the bridging members 8 are welded or soldered to the free end portions of the pole pieces 8'. During the joining of the bridge members 8 to the ends of the pole pieces, and the same of course applies to the pole pieces 8'', these bridging members 8 are held in position by suitable auxiliary devices which are not shown in and which are only temporary in that they serve only to hold the bridging members 8 in positions during the joining of the bridging members 8 to the several pole pieces. In order to enable the elements which hold the bridging members 8 in position during the joining thereof to the pole pieces to be easily and quickly moved into and out of position, the cover 5 is formed with the elongated groove portions 31 (FIG. 3) which extend from the recesses which receive the bridging members to the side portions of the cover, and thus it is easy to slip through these elongated portions 31 the devices which temporarily hold the bridging members 8 in position while they are joined to the pole pieces. Thus, these temporary holding devices can be guided by the elongated groove portions to and from the positions temporarily holding the bridging members 8 and when the temporary holding members are removed after the members 8 have been joined to the pole pieces it is possible to fill the recesses in the upper face of the cover member 5 with a suitable sealing mass 32 preferably in the form of a thermoplastic material which may be of the very same material that is used for the housing 4 and the cover 5. The sealing mass 32 fills the elongated portions 31 of the cover as well as the recesses which receive the bridging members 8 and the pole pieces. It will be noted that the mass 32 completely surrounds the portions of the pole pieces which extend into the recess of the cover as well as the bridging member 8. The injection of the mass 32 into the cover recesses can be simplified by placing preformed pieces of suitable shape in the elongated groove portions 31 so as to fill the latter with these suitably shaped parts. However, it is particularly time-saving when the material used to seal the bridging members and free ends of the pole pieces is the very same material used to bond the cover and housing to each other and when the sealing mass 32 is injected at the same time as the sealing mass 7 so that in one operation all of these processes are carried out. The cover 5 is formed with a series of small and unillustrated openings which communicate with the continuous passage which receives the sealing mass 7 and suitable injection nozzles communicate through these latter openings with this passage which receives the sealing mass 7, and the injector assembly is also provided with nozzles which inject the sealing masses 32 at the same time into the cover recesses, so that in one single operation the cover is joined to the housing and the recesses thereof are filled with the sealing mass 32.

After the several recesses of the cover which receive the bridging members 8 have been filled with the sealing mass 32 and the latter has hardened, relatively small and shallow bores 33 are formed in the sealing mass 32 directly over the bridging members 8 so that a relatively small surface portion of each bridging member 8 is accessible through the bore 33 to enable suitable instruments to be placed on the battery for measuring the cell voltage.

The negative sets of plates are connected to pole pieces 8' which are different from the other pole pieces in that they are provided with ribs 34, as shown at the lower right portion of FIG. 6, and these ribs 34 are received in mating recesses 35 formed at the underside of the cover 5, so that as a result of this feature it is impossible to place the sets of plates in the battery in incorrect positions. In other words if the plates are put in incorrectly this fact will become immediately apparent when the parts do not go together properly and the positions of the plates can then be corrected.

Thus, it will be seen that with the above-described structure an exceedingly small battery is provided, as compared to conventional batteries of the same output, while at the same time the various components thereof are very easy to assemble quickly and in addition the battery can be very securely and easily mounted in position and serviced.

It will be understood that each of the elements described above, or two or more together, may also find a useful application in other types of storage batteries differing from the types described above.

While the invention has been illustrated and described as embodied in automobile storage batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and described to be secured by Letters Patent is:

1. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; and three bridging members respectively located in said recesses beneath said upper face of said cover and bridging said three pairs of pole pieces, respectively, for electrically interconnecting said pairs of pole pieces.

2. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof, said cover having at the exterior of said one pair of opposed side walls of said housing a pair of lateral extensions having undersides respectively formed with grooved surfaces so that said extensions may be engaged for conveniently carrying the battery; and three bridging members respectively located in said recesses beneath said upper face of said cover and bridging said three pairs of pole pieces, respectively, for electrically interconnecting said pairs of pole pieces.

3. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof, said cover having at a pair of opposed longitudinal edge portions thereof a rounded exterior configuration so that a holding strap can extend across said cover and transversely past said edge portions thereof; and three bridging members respectively located in said recesses beneath said upper face of said cover and bridging said three pairs of pole pieces, respectively, for electrically interconnecting said pairs of pole pieces.

4. In a storage battery, in combination, a housing having a bottom wall and two pairs of opposed side walls extending upwardly from said bottom wall and a partition extending upwardly from said wall parallel to and located between one of said pairs of opposed side walls for dividing the interior of said housing into at least two cells, said one pair of opposed side walls and said partitions having upper edge portions respectively formed with notches, said housing having at one of its pairs of opposed side walls inwardly directed portions extending longitudinally along opposed edges of and joined to said bottom wall and said housing including a pair of elongated mounting portions fixed to, extending along, and projecting from said inwardly directed portions at the exterior of said housing; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; and three bridging members respectively located in said recesses beneath said upper face of said cover and bridging said three pairs of pole pieces, respectively, for electrically interconnecting said pairs of pole pieces.

5. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said uper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof, said cover being formed over said cells, respectively, with filling openings adapted to be closed by removable plugs and through which the cells can be filled, said filling openings including portions beneath the upper face of said cover for receiving said plugs with said plugs substantially entirely situated beneath the upper face of said cover; and three bridging members respectively located in said recesses beneath said upper face of said cover and bridging said three pairs of pole pieces, respectively, for electrically interconnecting said pairs of pole pieces.

6. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof, said cover being formed over said cells, respectively, with filling openings adapted to be closed by removable plugs and through which the cells can be filled, said filling openings including portions beneath the upper face of said cover for receiving said plugs with said plugs substantially entirely situated beneath the upper face of said cover, and said cover also being formed over said cells, respectively, with substantially funnel-shaped recesses extending beneath the upper face of said cover, said cover being formed with openings passing through said cover and communicating with said latter recesses thereof so that gas may escape from the interior of said cells into said funnel-shaped recesses, said cover carrying plates which cover said funnel-shaped recesses thereof and which are respectively formed with openings out of line with said openings which communicate with said funnel-shaped recesses, respectively, so that gas can escape to the exterior through said openings of said plates, said plates respectively carrying at undersides thereof walls which extend downwardly into said funnel-shaped recesses for preventing liquid in said cells from splashing or spraying to the exterior of the battery; and three bridging members respectively located in said recesses beneath said upper face of said cover and bridging said three pairs of pole pieces, respectively, for electrically interconnecting said pairs of pole pieces.

7. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof, said cover being formed over said cells with filling openings, respectively, adapted to be closed by plugs removably connected to said cover and when closing said openings having top surfaces which do not extend beyond the upper face of said cover, and said cover having below said filling openings thereof ledges carried by said cover, extending in part beneath said filling openings, respectively, and having an elevation which coincides substantially with the proper elevation of the surface of a liquid located in said cells, so that liquid-removing devices may engage said ledges to remove liquid from said cells until the surface of liquid in said cells has the same elevation as said ledges; and three bridging members respectively located in said recesses beneath said upper face of said cover and bridging said three pairs of pole pieces, respectively, for electrically interconnecting said pairs of pole pieces.

8. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells, said outer pole pieces respectively having portions of dovetail cross section in the region of lower end portions thereof and said housing being formed at the exterior of said one pair of opposed side walls thereof with dovetail grooves respectively receiving said dovetail portions of said outer pole pieces for mounting the latter on said housing; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; and three bridging members respectively located in said recesses beneath said upper face of said cover and bridging said three pairs of pole pieces, respectively, for electrically interconnecting said pairs of pole pieces.

9. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells, said outer pole pieces having connector extensions, respectively, to which cables are adapted to be connected; a pair of cover members of electrically non-conductive material carried by said housing at the exterior of said one pair of opposed side walls thereof and covering said connector extensions of said outer pole pieces; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; and three bridging members respectively located in said recesses beneath said upper face of said cover and bridging said three pairs of pole pieces, respectively, for electrically interconnecting said pairs of pole pieces.

10. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells, said outer pole pieces having connector extensions, respectively, to which cables are adapted to be connected; a pair of cover members of electrically non-conductive material carried by said housing at the exterior of said one pair of opposed side walls thereof and covering said connector extensions of said outer pole pieces, said cover members for said connector extensions of said outer pole pieces being made of a flexible material and terminating in outwardly directed flanges located next to the exterior surface of said one pair of opposed side walls of said housing and said housing carrying claws into which said flanges of said cover members snap for removably connecting said cover members to said housing; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; and three bridging members respectively located in said recesses beneath said upper face of said cover and bridging said three pairs of pole pieces, respectively, for electrically interconnecting said pairs of pole pieces.

11. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof; three bridging members respectively located in said recesses beneath said upper face of said cover and bridging said three pairs of pole pieces, respectively, for electrically interconnecting said pairs of pole pieces; and a sealing mass located in said recesses and surrounding said bridging members and free end portions of said pole pieces, said sealing mass being made of a thermoplastic synthetic resin.

12. In a storage battery, in combination, a housing having a bottom wall and two pairs of opposed side walls extending upwardly from said bottom wall and a partition extending upwardly from said bottom wall parallel to and located between one of said pairs of opposed side walls for dividing the interior of said housing into at least two cells, said one pair of opposed side walls and said partition having upper edge portions respectively formed with notches; at least two groups of plates respectively located in said cells; three pairs of pole pieces between which said one pair of opposed side walls and said partition are respectively located with said notches thereof situated between said pairs of pole pieces, respectively, said pole pieces including two outer pole pieces respectively carried by said one pair of opposed side walls at the exterior thereof and two inner pole pieces respectively located adjacent said one pair of opposed side walls in the interior of said housing and operatively connected to the groups of plates respectively located in said cells, said pole pieces including two additional inner pole pieces respectively located on opposite sides of and adjacent to said partition and also operatively connected to said groups of plates in said cells, respectively; a cover located on and covering said housing, said cover having an underside formed with a continuous groove receiving upper edge portions of said opposed pairs of side walls of said housing and with an additional uninterrupted groove communicating with said continuous groove and receiving the upper edge portion of said partition, said upper edge portions of said side walls and partition being fluid-tightly connected along their entire length to said cover in said grooves thereof and said cover having grooved portions extending downwardly into said notches respectively between said pairs of pole pieces so that the connection of said cover to said housing extends uninterruptedly between said pole pieces, said cover being formed in its upper face with at least three recesses extending downwardly below said upper face of said cover, and said cover also being formed with three pairs of openings respectively extending from said recesses through said cover, said pole pieces respectively extending upwardly through and filling said openings and terminating in free end portions situated within said recesses of said cover beneath said upper face thereof;

three bridging members respectively located in said recesses beneath said upper face of said cover and bridging said three pairs of pole pieces, respectively, for electrically interconnecting said pairs of pole pieces; and a sealing mass located in said recesses and surrounding said bridging members and free end portions of said pole pieces, said sealing mass being made of a thermoplastic synthetic resin, and said cover and housing being fluid-tightly connected to each other in part by a thermoplastic sealing mass engaging the upper faces of the top edge portions of said side walls and partition and engaging the base of the groove of said cover which receives said side walls and said partition, said sealing mass between said cover and said side walls and partition of said housing being the same as the sealing mass in said recesses.

References Cited by the Examiner

UNITED STATES PATENTS

| | | | |
|---|---|---|---|
| 1,988,111 | 1/1935 | Dunzweiler | 136—168 X |
| 2,132,793 | 10/1938 | Klye | 136—135 |
| 3,075,036 | 1/1963 | Shank et al. | 136—134 |

WINSTON A. DOUGLAS, *Primary Examiner.*

D. L. WALTON, *Assistant Examiner.*